INVENTOR

Raleigh Warren Wise

3,468,161
Patented Sept. 23, 1969

3,468,161
METHOD AND DEVICE FOR MEASURING
MECHANICAL STRESS AT PREDETER-
MINED STRAIN
Raleigh Warren Wise, Akron, Ohio, assignor to Monsanto
Company, St. Louis, Mo., a corporation of Delaware
Filed Apr. 27, 1967, Ser. No. 634,257
Int. Cl. G01b 7/16
U.S. Cl. 73—101                                    8 Claims

ABSTRACT OF THE DISCLOSURE

This invention is a device and method for measuring mechanical stress at a predetermined strain of a plastic sample. The device is comprised of a system of switches operated by the strain-testing instrument for plastic materials. The system of switches is positioned so that the switches are activated by the testing instrument at the peak starin of a plastic sample subject to cyclic deformation in the instrument. The electrical signal obtained from the output of a force transducer connected to the instrument is rectified with the aid of a capacitor-switch combination to a signal suitable for recording a smooth curve on a recorder.

BACKGROUND OF THE INVENTION

The invention pertains to the art of measuring and recording mechanical stress of plastic and other solid deformable substances by electrical means.

Several methods are available for measuring and recording the stress signal obtained from testing instruments such as the oscillating disk rheometer disclosed in the co-pending U.S. patent application of George E. Decker, Ser. No. 282,527, filed May 6, 1963, or the instruments disclosed in Peter's U.S. Patent 3,039,297, Cl. 73—88, assigned to Bayer (1962), or J. R. Beatty's U.S. Patent 3,182,494, Cl. 73—101, assigned to the B. F. Goodrich Company (1965). For example, the sinusoidal stress signal can be recorded directly. This is not desirable because the entire stress/strain cycle is recorded rather than a continuous smooth curve. The sinusoidal stress signal can be converted to a DC signal suitable for recording to obtain a smooth curve, but a complicated expensive electronic device is required. See A. V. Mitchell's U.S. Patent 2,942,188, Cl. 324—118, assigned to Tung-Sol Electric, Inc. (1960). Gustafsson in U.S. Patent 2,916,701, Cl. 324—102 (1959), discloses sampling the AC signal from a stress-measuring bridge and sampling the signal by means of a sampling relay. The direct signal obtained by Gustafsson is in the form of a pulsating direction current which is not suitable for recording. The unrectified voltage is displayed on an oscilloscope in Gustafsson's device.

Voltage-multiplying rectifier circuits are known and discussed in Applied Electronics, chapter VI, pp. 334–337, John Wiley (1954).

Often, when measuring the output of a strain gauge, there is a combination of a static DC signal superimposed on the AC signal which is to be measured. When the signal is taken directly from the strain gauge, the DC component must be removed by adjustment of a balancing network connected to the strain gauge. This is undesirable because it requires an additional adjustment in the strain-gauge circuit which is both time consuming and critical. By using the circuitry of this invention, the DC component is automatically removed by virtue of the fact that only the voltage associated with the AC signal is measured. The normally required strain-gauge balancing circuit is not required with this invention.

Testing instruments which impose cyclic shearing forces on the test material are preferably at a wide variety of reciprocating frequencies. AC/DC conversion techniques which operate over a wide frequency range are complicated. This invention measures the AC output of strain gauges over a frequency range as low as 1 cycle per minute to 900 cycles per minute. In combination with its wide frequency response, this invention allows rapid response to changes in the magnitude of the voltage output of the strain gauge. This is an important consideration in making measurements with instruments such as the oscillating disk rheometer since the signal often changes rapidly throughout the test.

AC/DC converters normally measure either the peak or the average of the AC voltage output of strain gauges. In measuring the dynamic modulus of elastomers being subject to cyclic deformation, it is often more desirable to measure the voltage generated by the strain gauge at maximum strain imposed on the sample in order to obtain the in-phase dynamic modulus. Conversely, measurement at zero strain, which is also convenient with the present invention, provides out-of-phase dynamic modulus. In order to make such a measurement with presently available devices, it is necessary to use an instrument called a vector voltmeter or phase-sensitive AC/DC converter. The vector voltmeter and the phase-sensitive AC/DC converter require that both a signal associated with the strain imposed on the sample and the resulting stress be measured and processed. This invention requires only a single signal, i.e., the signal associated with the modulus of the test specimen.

The voltage across the output capacitor is the same as the output signal from the strain gauge. Calibration of the force transducer is simplified with this invention since the force transducer can be loaded with a static force. The DC output is measured to ascertain the sensitivity of the transducer to the given applied force without consideration of the gain of the AC/DC converter.

Frequently, in testing rubber samples with an oscillating disk rheometer, there is an undesirable high content of harmonics which appear at the output of the stress-measuring transducer. Is is desirable to reject these harmonics and measure only the applied frequency. This invention attenuates to a high degree all even harmonics when the two-switch system is used.

SUMMARY

The invention is an AC/DC converter based on electromechanical sampling of the stress signal from a testing instrument for materials such as elastomers or plastics. The invention comprises a device for obtaining a constant electrical signal proportional to the stress on a test specimen at a predetermined strain. The test specimen is subject to cyclical variation in strain by the test instrument. A force transducer senses the stress on the test specimen. A capacitor or a pair of capacitors are connected to the force transducer to charge to a voltage equal to the output of the force transducer. A switch or a pair of switches are connected to the capacitor or capacitors and transducer. The switch or switches are mechanically activated by the test instrument at a predetermined strain on a specimen in the test instrument. For example, the switch or switches may be activated by a magnet attached to the periphery of the shaft of the motor of the test instrument. The switches are positioned so that they are activated at a predetermined point of the strain cycle. The mechanical stress at the predetermined point of the strain of the plastic sample is measured, and a smooth curve is recorded.

PREFERRED EMBODIMENTS

Figure 1:
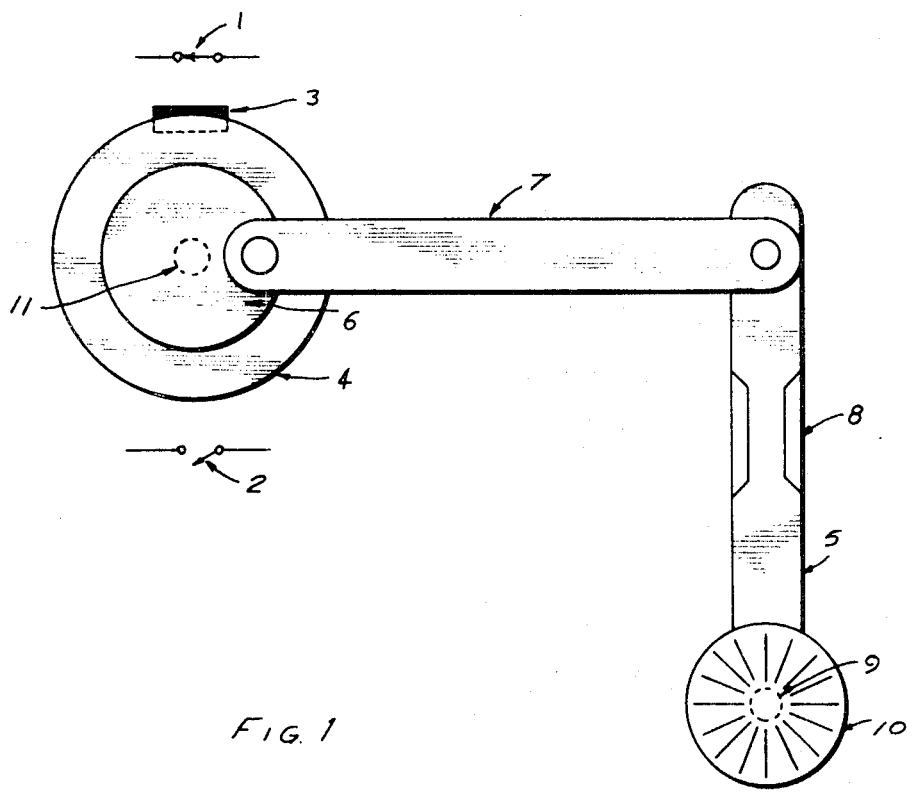
FIGURE 1 illustrates a top view of an oscillating disk rheometer, with a magnet on a flange connected to the motor shaft, and two switches.
Figure 2:
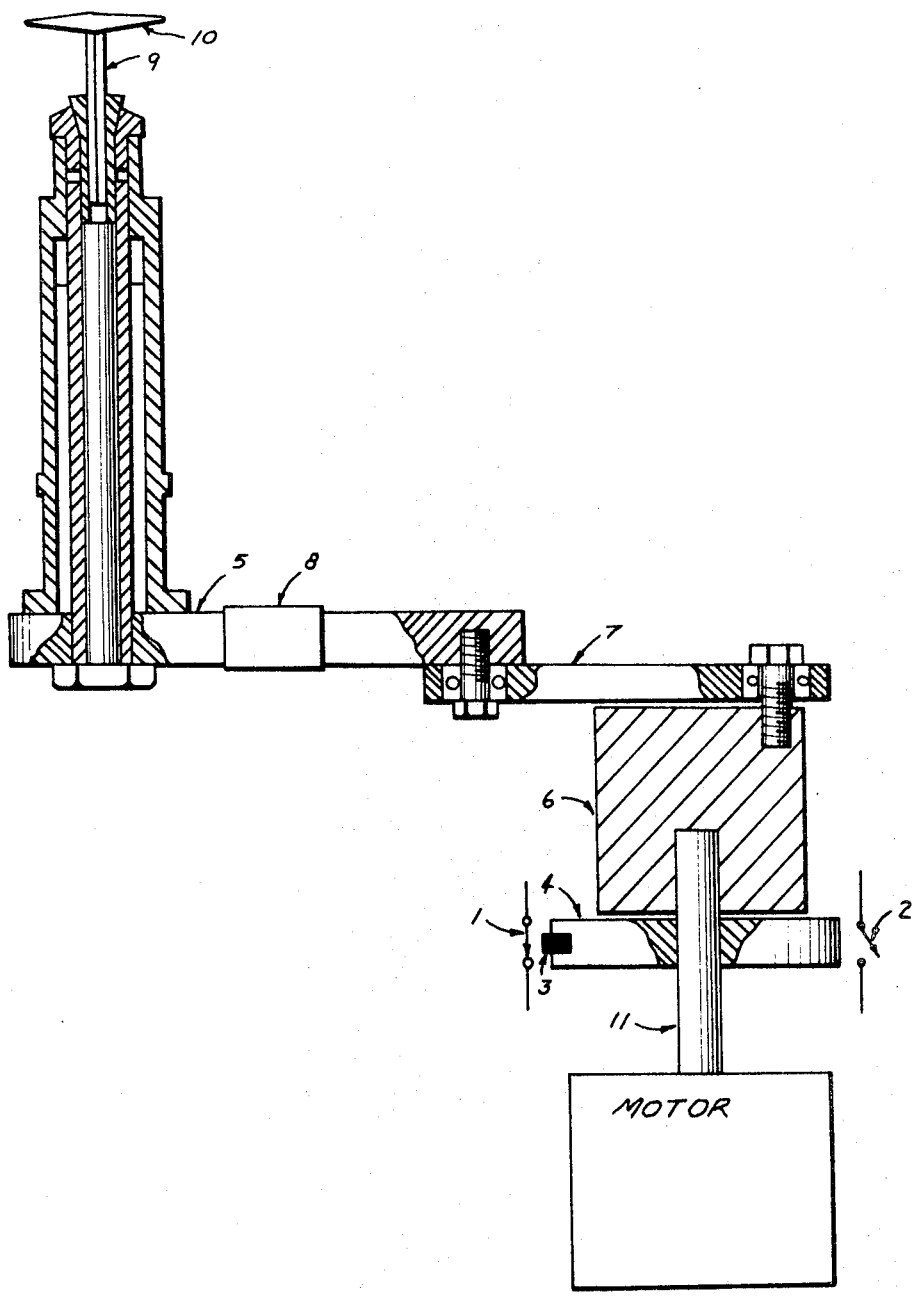
FIGURE 2 illustrates a side view of the oscillating disk rheometer, with a magnet on a flange connected to the motor shaft, and two switches.

The invention is an improvement in AC/DC converters. The invention is based on electromechanical sampling of the stress signal from an elastomer sample. The device comprises a magnet 3 (FIGS. 1 and 2) attached to the flange 4 on the motor shaft 11 used to oscillate a rotor 10. Two proximity switches 1 and 2 are located so that each time the magnet passes a switch, the switch contacts close. The magnet may be designed, for example, to sample 5° out of the 360° of the strain cycle (see FIG. 5). The optimum size of the sample period will vary with the frequency. The optimum represents a compromise between a desirably small sample period and practical limitations as to the speed of response. The switches are preferably positioned so that they are activated at the extremes of the rotor 10 (FIGS. 1 and 2) oscillation; i.e., peak of the strain cycle. Though magnetic proximity switches are used as illustrations, any type of switching system can be used. A sinusoidal output signal is generated by a force transducer 8 (FIGS. 1 and 2) engaged to arm 5. A motor-driven eccentric 6 is connected to the arm 5 by a connecting link 7. The arm 5 is connected to a shaft 9 to which the rotor 10 is attached at the end opposite arm 5. The rotor 10 is embedded in a rubber sample. When the motor is energized, the eccentric 6 revolves, causing the rotor 10 to oscillate. The force required to oscillate the rotor 10 is measured by the force transducer 8. The magnet 3 is attached to the periphery of the flange 4 so that when the rotor 10 is at the extremes of its oscillations, the magnet 3 activates the sampling switches 1 and 2, i.e., switch 1 on the positive extreme and switch 2 on the negative extreme.

Figure 3:
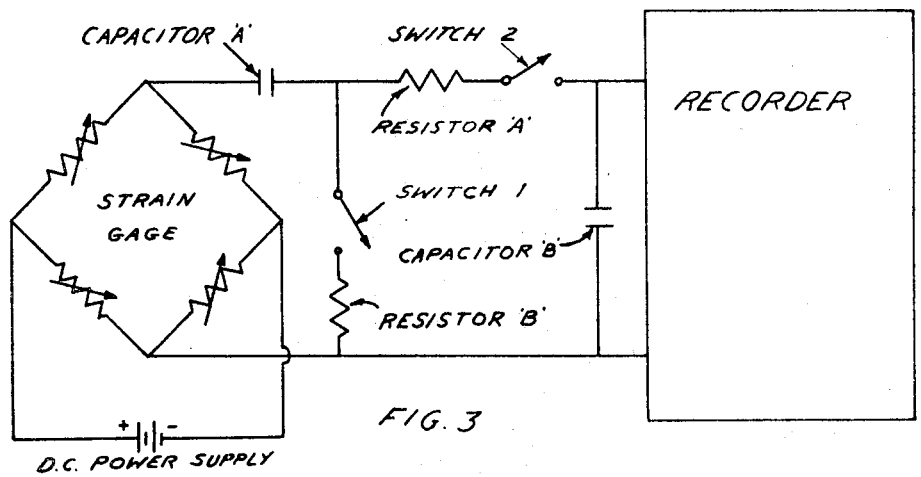
FIGURE 3 illustrates the circuitry of the invention.

The circuitry is illustrated in FIGURE 3. A conventional strain-gauge force transducer is excited with direct current. Sampling switch 1 closes at positive maximum strain of the rubber sample and sampling switch 2 closes at negative maximum strain. When sampling switch 1 closes, capacitor A charges to a voltage equal to the output of the force transducer at maximum positive strain of the rubber sample. When sampling switch 2 closes, capacitor B charges to a voltage equal to the ouput of the force transducer at maximum negative strain of the rubber sample plus the voltage across capacitor A or the sum of both positive and negative signals. This is a conventional half-wave voltage-doubler circuit in which the conventional rectifiers (see Applied Electronics, supra) are replaced by sampling switches 1 and 2. Capacitor B charges to a voltage corresponding to peak stress of the rubber sample at maximum strain. If the modulus of the elastomer sample changes, the voltage across capacitors A and B also change with the next cycle of the rotor 10 (FIG. 1), thus yielding a DC signal which is graphically recorded as a smooth curve on the recorder. A full-wave voltage doubler circuit may be used if desired. Although a wave doubler circuit is advantageous and is preferred, the system is operative without it. The values of resistance and capacitance are chosen to yield a time constant which is optimum for the range of test frequencies involved. Typical values for optimum operation over a test frequency of 3 to 900 cycles per minute are 2 μf. and 10K.

The circuitry is illustrated using a four-active-element strain gauge; however, any transducer can be used with this invention. For example, a one-active-arm strain gauge or a differential transformer can be used. The preferred recorder useful in this invention has a high-input impedance. A high impedance direct current voltmeter or other indicating device may be used.

The system is operative using a single switch in the sampling circuit. With only one switch and one capacitor, the stress measurement will be zero to peak instead of peak to peak. Any inherent imbalance in the strain-gauge bridge circuit comprising the force transducer yields a superimposed direct current signal which is measured along with the alternating-current test signal. The DC signal is removed by balancing the strain-gauge bridge circuit prior to measuring the AC test signal. This adjustment is avoided in either the full- or half-wave voltage doubling circuits which utilize the two-switch circuit. Balancing the strain-gauge bridge circuit for the purpose of removing the DC signal in the one-switch system may be circumvented by decoupling the DC signal from the AC test signal to be measured by an appropriate resistance capacitance network. The AC signal which appears across the resistor in the decoupling network is sampled. However, this degrades the response of the system to rapidly changing AC current because of the high values of resistance and capacitance which must be used to prevent undue attenuation of the AC test signal. This test signal undergoes a shift in phase with the test frequency because of the resistance and capacitance in the decoupling circuit. The shift in phase changes the portion of the AC test signal which is sampled and thus makes the position of the sampling switch dependent on the test frequency.

The switch used in the practice of this invention is mechanically activated by the test instrument at a predetermined strain on a test specimen in the instrument. The activation is done by means connected to the part of the test instrument which applies the strain to the test specimen. For example, a magnet attached to the periphery of the shaft of the test instrument's motor may be used to operate a magnetically sensitive switch as illustrated and described, supra. The switch may be electrically, mechanically, or otherwise operated by the part of the test instrument which applies the strain on the test specimen.

Figure 4:
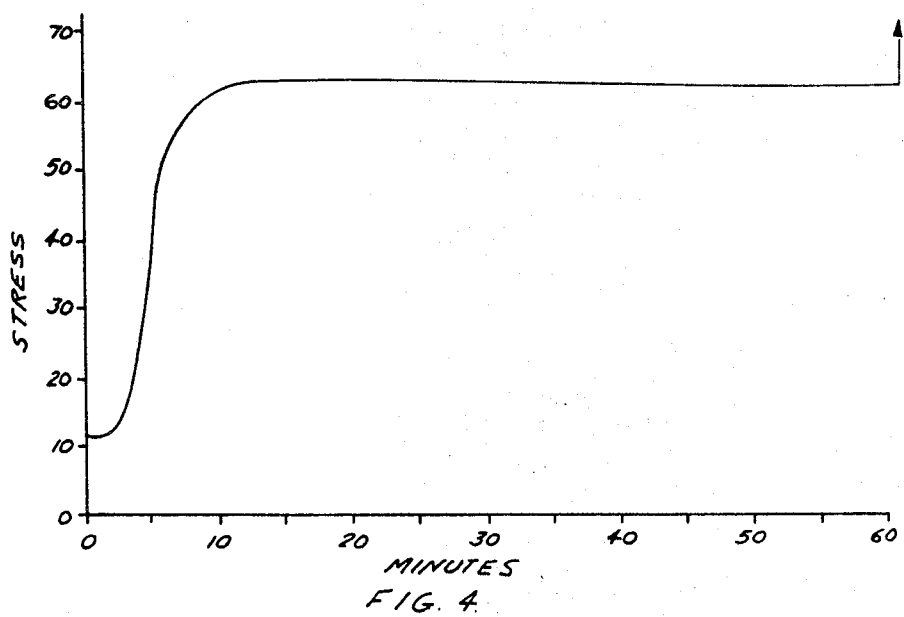
FIGURE 4 illustrates the smooth curve obtained operating an oscillating disk rheometer with this invention at 100 cycles per minute.

FIGURE 4 illustrates the smooth curve obtained operating an oscillating disk rheometer at 100 cycles per minute with this invention. The curve plots stress vs. time and shows the change in stress of the elastomer sample with curing.

Figure 5:
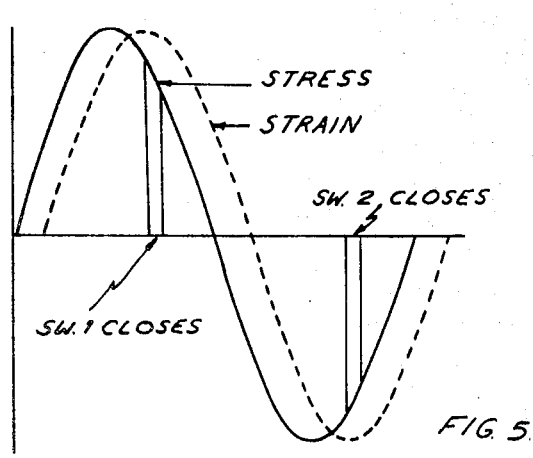
FIGURE 5 illustrates the sampling times measuring the mechanical stress at a predetermined strain.

FIGURE 5 illustrates the sampling taken from the mechanical stress signal by switch 1 and switch 2. Since the sampling switches close at peak strains of the elastomer sample, the stress at peak strain, i.e. the in-phase elastic portion of the complex dynamic modulus, is measured as opposed to the maximum stress (see FIG. 5).

The invention is applicable to any testing instrument for testing the cyclic deformation of plastics, or elastomers such as rubber. It is especially applicable to instruments such as the oscillating disk rheometer illustrated in the preferred embodiments.

I claim:

1. A test device for obtaining a constant electrical signal proportional to the stress on a test specimen at a predetermined strain, the test specimen being subjected to cyclical variation in strain by a test instrument, comprising in combination:

a force transducer to sense the stress on the test specimen, a capacitor connected to the force transducer to charge to a voltage equal to the output of the force transducer, a switch connected to the capacitor and transducer mechanically activated by the test instrument which applies the strain on the test specimen to sample a DC electrical signal corresponding to the stress on the test specimen at the predetermined strain over a time fraction of the strain cycle, and means for measuring the constant DC electrical signal which appears across the capacitor.

2. A test device according to claim 1 wherein the switch is activated by a magnet at the maximum strain applied by the test instrument.

3. A test device for obtaining a constant electrical signal proportional to the stress on a test specimen at a predetermined strain, the test specimen being subjected to cyclical variation in strain by a test instrument, comprising the combination:

a force transducer to sense the stress on the test specimen, a pair of capacitors connected to the force transducer, the first capacitor charging to a voltage equal to the output of the force transducer at a predetermined positive strain on the test specimen, the second capacitor charging to a voltage equal to the output of the force transducer at a predetermined negative strain of the cycle of the test specimen plus the voltage across the first capacitor, a pair of switches connected to the capacitors and transducer; the first switch being mechanically activated by the test instrument at a position corresponding to the predetermined positive strain on the test specimen, the second switch being mechanically activated by the test instrument at a predetermined negative strain of the cycle of the test specimen; to sample an electrical signal corresponding to the stress at the predetermined strain over a time fraction of the strain cycle, and means for measuring the constant electrical signal which appears across the capacitor.

4. A test device according to claim 3 with the first capacitor charging to a voltage equal to the output of the force transducer at maximum positive strain on the test specimen, and the second capacitor charging to a voltage equal to the output of the force transducer at maximum negative strain on the test specimen plus the voltage across the first capacitor, and the first switch being mechanically activated by the test instrument at a position corresponding to the maximum positive strain on the test specimen and the second switch being mechanically activated by the test instrument at a position corresponding to the maximum negaitve strain of the test specimen.

5. A test device according to claim 4 wherein the switches are activated at the maximum strain applied by the test instrument by a magnet attached to the periphery of the shaft of the motor of the test intsrument.

6. In a method of measuring the rheological properties of a solid deformable substance wherein the said substance is subjected to shearing force by an oscillating drive mechanism and the shearing force is sensed by an A.C. signal, the improvement which comprises sensing the shearing force on the substance at predetermined strain over a predetermined time fraction of the strain cycle and converting the A.C. signal to a steady D.C. signal suitable for recording.

7. Method of claim 6 in which the shearing force is measured at maximum strain.

8. Method of claim 7 in which the shearing force is sensed at maximum positive strain and at maximum negative strain and the sum is measured.

References Cited

UNITED STATES PATENTS

| 2,905,898 | 9/1959 | Bernstein | 324—102 XR |
| 2,916,701 | 12/1959 | Gustafsson et al. | 73—88.5 XR |
| 3,183,707 | 5/1965 | Gurney et al. | 73—91 XR |
| 3,256,741 | 6/1966 | Wise | 73—89 XR |

FOREIGN PATENTS 1,006,354 9/1965 Great Britain.

CHARLES A. RUEHL, Primary Examiner

U.S. Cl. X.R.

73—67.1, 89